(12) United States Patent
Moon et al.

(10) Patent No.: US 12,512,466 B2
(45) Date of Patent: Dec. 30, 2025

(54) ANODE ACTIVE MATERIAL FOR A LITHIUM SECONDARY BATTERY, METHOD OF PREPARING THE SAME AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Joon Hyung Moon, Daejeon (KR); Eun Jun Park, Daejeon (KR); Jung Hyun Yun, Daejeon (KR); Ju Ho Chung, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/457,952

(22) Filed: Aug. 29, 2023

(65) Prior Publication Data

US 2024/0113290 A1    Apr. 4, 2024

(30) Foreign Application Priority Data

Sep. 29, 2022   (KR) .................. 10-2022-0124143

(51) Int. Cl.
*H01M 4/38*    (2006.01)
*H01M 4/04*    (2006.01)
(Continued)

(52) U.S. Cl.
CPC ......... *H01M 4/386* (2013.01); *H01M 4/0471* (2013.01); *H01M 4/364* (2013.01);
(Continued)

(58) Field of Classification Search
CPC ...... H01M 4/386; H01M 4/134; H01M 4/366; H01M 4/587; H01M 4/625; H01M 4/133;
(Continued)

(56) References Cited

U.S. PATENT DOCUMENTS

2017/0110722 A1*  4/2017  Lee .................. H01M 4/366

FOREIGN PATENT DOCUMENTS

| CA | 3 157 142 | * | 7/2021 |
| EP | 3965192 A1 | | 3/2022 |

(Continued)

OTHER PUBLICATIONS

Zhao et al. "Raman scattering characterization of a carbon coating after low-energy argon ion bombardment". Physica B: Condensed Matter; vol. 406; Issue 20; Oct. 15, 2011; pp. 3876-3884.*

*Primary Examiner* — Laura Weiner
(74) *Attorney, Agent, or Firm* — Perkins Coie LLP

(57) ABSTRACT

An anode active material for a lithium secondary battery and a lithium secondary battery including the same are provided. The anode active material includes a plurality of composite particles, each composite particle including a silicon-based active material particle including silicon; and a carbon coating layer formed on at least a portion of a surface of the silicon-based active material particle, wherein a relative standard deviation of G/Si peak intensity ratios of a Raman spectrum as defined in Equation 1 measured for each of 50 different composite particles among the plurality of composite particles is 50% or less.

5 Claims, 2 Drawing Sheets

(51) Int. Cl.
  *H01M 4/36*      (2006.01)
  *H01M 4/48*      (2010.01)
  *H01M 4/587*     (2010.01)
  *H01M 4/62*      (2006.01)
  *H01M 10/0525*   (2010.01)
  *H01M 4/133*     (2010.01)
  *H01M 4/134*     (2010.01)
  *H01M 4/136*     (2010.01)

(52) U.S. Cl.
  CPC ............. *H01M 4/366* (2013.01); *H01M 4/48* (2013.01); *H01M 4/587* (2013.01); *H01M 4/625* (2013.01); *H01M 10/0525* (2013.01); *H01M 4/0404* (2013.01); *H01M 4/133* (2013.01); *H01M 4/134* (2013.01); *H01M 4/136* (2013.01)

(58) Field of Classification Search
  CPC ................... H01M 4/136; H01M 4/48; H01M 2004/027; H01M 2004/021
  See application file for complete search history.

(56) References Cited

FOREIGN PATENT DOCUMENTS

| | | |
|---|---|---|
| KR | 10-1591698 B | 1/2016 |
| KR | 10-2021-0053059 A | 5/2021 |
| KR | 10-2021-0110609 A | 9/2021 |
| WO | WO 2015/118846 * | 8/2015 |
| WO | 2020/105695 A1 | 5/2020 |
| WO | 2021-241751 A1 | 12/2021 |

* cited by examiner

ANODE ACTIVE MATERIAL FOR A LITHIUM SECONDARY BATTERY, METHOD OF PREPARING THE SAME AND LITHIUM SECONDARY BATTERY INCLUDING THE SAME

CROSS-REFERENCE TO RELATED APPLICATION AND CLAIM OF PRIORITY

This patent document claims the priority and benefits of Korean Patent Applications No. 10-2022-0124143 filed on Sep. 29, 2022, the entire disclosure of which is incorporated herein by reference.

TECHNICAL FIELD

The present disclosures relate to an anode active material for a lithium secondary battery, a method of preparing the same, and a lithium secondary battery including the anode active material.

BACKGROUND

The rapid growth of electric vehicles and portable devices, such as camcorders, mobile phones, and laptop computers, has brought increasing demands for secondary batteries, which can be repeatedly charged and discharged. Recently, a battery pack including the secondary battery has also been developed and applied to eco-friendly vehicles such as electric vehicles and hybrid vehicles.

SUMMARY

In an aspect of the present disclosures, there is provided an anode active material for a lithium secondary battery having improved output properties and capacity efficiency.

In an aspect of the present disclosures, there is provided a method of preparing an anode active material for a lithium secondary battery having improved output properties and capacity efficiency.

In an aspect of the present disclosures, there is provided a lithium secondary battery including the anode active material having improved output properties and capacity efficiency.

An anode active material for a battery (e.g., lithium secondary battery) includes a plurality of composite particles, each composite particle including a silicon-based active material particle including silicon, and a carbon coating layer formed on at least a portion of a surface of the silicon-based active material particle. A relative standard deviation of G/Si peak intensity ratios of a Raman spectrum as defined in Equation 1 measured for each of 50 different composite particles among the plurality of composite particles is 50% or less.

$$G/Si \text{ peak intensity ratio of Raman spectrum} = I_G/I_{Si} \quad \text{[Equation 1]}$$

In Equation 1, $I_G$ is a maximum peak intensity of each composite particle in a wavenumber range from 1565 cm$^{-1}$ to 1620 cm$^{-1}$ of the Raman spectrum, and $I_{Si}$ is a maximum peak intensity of each composite particle in a wavenumber range from 450 cm$^{-1}$ to 550 cm$^{-1}$ of the Raman spectrum.

In some embodiments, the relative standard deviation may be determined by: obtaining a value obtained by dividing a standard deviation of the G/Si peak intensity ratios of the Raman spectrum by an average of the G/Si peak intensity ratios of the Raman spectrum; and then multiplying the value by 100.

In some embodiments, the G/Si peak intensity ratios of the Raman spectrum may be in a range from 1 to 9.

In some embodiments, the silicon-based active material particle may include at least one selected from the group consisting of Si, SiOx (0<x≤2), and a Si—C composite.

In some embodiments, a content of the carbon coating layer based on a total weight of the composite particles may be in a range from 1 percent by weight (wt %) to 8 wt %.

In some embodiments, the silicon-based active material particle may be doped with at least one selected from the group consisting of Li, Mg, Al, Ca, Fe, Ti, and V.

In another aspect of the present disclosures, there is provided a lithium secondary battery including an anode which includes the above-described anode active material for a lithium secondary battery, and a cathode disposed to face the anode.

In another aspect of the present disclosures, there is provided a method of preparing an anode active material for a lithium secondary battery. The method includes preparing or forming a plurality of silicon-based active material particles, and forming a plurality of composite particles, each composite particle including a carbon coating layer formed on at least a portion of a surface of at least one of the plurality of silicon-based active material particles by mixing the plurality of silicon-based active material particles with a carbon source gas to generate a mixture and calcining the mixture. A relative standard deviation of G/Si peak intensity ratios of a Raman spectrum as defined in Equation 1 measured for each of 50 different composite particles among the plurality of composite particles is 50% or less.

$$G/Si \text{ peak intensity ratio of Raman spectrum} = I_G/I_{Si} \quad \text{[Equation 1]}$$

In Equation 1, $I_G$ is a maximum peak intensity of each composite particle in a wavenumber range from 1565 cm$^{-1}$ to 1620 cm$^{-1}$ of the Raman spectrum, and $I_{Si}$ is a maximum peak intensity of each composite particle in a wavenumber range from 450 cm$^{-1}$ to 550 cm$^{-1}$ in Raman spectrum.

In some embodiments, the forming of the plurality of silicon-based active material particles may include mixing and calcining a silicon source.

In some embodiments, the silicon source may include at least one of silicon or silicon dioxide (SiO$_2$).

In some embodiments, the carbon source gas may be a mixed gas including at least methane gas and argon gas.

In some embodiments, a content of the methane gas based on a total volume of the carbon source gas may range from 10 percent by volume (vol %) to 80 vol %.

In some embodiments, the content of the methane gas based on the total volume of the carbon source gas may range from 20 vol % to 60 vol %.

In some embodiments, the calcining may be performed at a temperature of 400° C. to 1200° C.

The above-described anode active material for a lithium secondary battery based on some embodiments of the present disclosures includes a plurality of composite particles including silicon-based active material particles and a carbon coating layer formed on at least a portion of surfaces of the silicon-based active material particles. For example, the silicon-based active material particles may provide high capacity properties to the anode active material. For example, through the carbon coating layer, resistance of the anode active material may be decreased and a side reaction with an electrolyte may be prevented. Accordingly, capacity properties and life-span properties of the anode active material may be improved.

A relative standard deviation of G/Si peak intensity ratios of a Raman spectrum that is obtained by measuring 50 different composite particles of the plurality of composite particles and applying the measurements to Equation 1 is 50% or less. Within the above range, an amount of the carbon coating formed on the surface of each of the silicon-based active material particles of the plurality of composite particles may be uniform as a whole. Accordingly, the amount of silicon-based active material particles exposed to the electrolyte among the silicon-based active material particles is decreased, such that a side reaction with the electrolyte is suppressed, and life-span properties of the anode active material may be improved.

In some embodiments, a content of the carbon coating layer based on the total weight of the composite particles may be 1 to 8% by weight ("wt %"). Within the above range, life-span properties may be improved by sufficiently suppressing a side reaction with the electrolyte while inhibiting a decrease in the capacity of the anode active material.

DETAILED DESCRIPTION OF THE EMBODIMENTS

Figure 1:
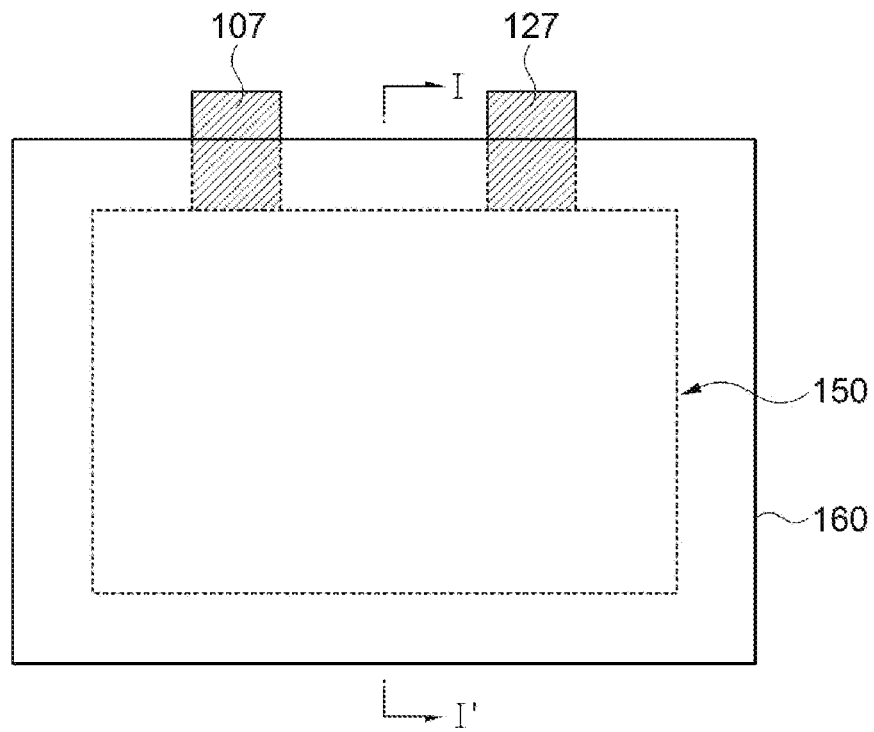
FIG. 1 is a schematic plan view illustrating an example of a lithium secondary battery based on some example embodiments of the present disclosures.

Section headings in this patent document are used only for the organization of the description and do not limit scope of the described embodiments.

The present disclosures may be implemented in some embodiments to provide an anode active material for a lithium secondary battery including carbon-based particles. The present disclosures may also be implemented in some embodiments to provide a method of preparing the anode active material for a lithium secondary battery including carbon-based particles. In some embodiments of the present disclosures, a secondary battery such as a lithium secondary battery includes the anode active material that includes carbon-based particles.

Some embodiments of the present disclosures will be described in detail by way of example only and not by limitation.

Examples of secondary battery may include a lithium secondary battery, a nickel-cadmium battery, a nickel-hydrogen battery and others. Lithium secondary battery, among others, has a high operating voltage and a high energy density per unit weight, and is advantageous in terms of charging speed and light weight.

In some implementations, a lithium secondary battery may include: an electrode assembly that includes a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are placed.

With the expansion of the secondary battery market, battery manufacturers continue their efforts to develop high-capacity, high-power lithium secondary batteries. In order to improve the capacity of the secondary batteries, for example, a composite compound of silicon and carbon having high capacity may be used for an anode active material. In some implementations, silicon-based particles may be coated with carbon. However, an excessive amount of carbon used for uniform carbon coating may result in a reduction of the capacity of the secondary battery.

In order to address these issues, the present disclosures may be implemented in some embodiments to provide an anode active material that includes a uniform carbon coating layer while maintaining its high capacity.

An anode active material for a lithium secondary battery includes a plurality of composite particles each including a silicon-based active material particle and a carbon coating layer formed on at least a portion of a surface of the silicon-based active material particle. In some implementations, the term "anode active material" may be used to indicate an anode active material for a lithium secondary battery.

For example, a plurality of silicon-based active material particles in the plurality of composite particles may provide high-capacity properties to the anode active material. For example, through the carbon coating layer, resistance of the anode active material may be decreased and a side reaction with the electrolyte may be prevented. Accordingly, capacity properties and life-span properties of the anode active material may be improved.

For example, the plurality of silicon-based active material particles may include at least one of Si, SiOx (0<x≤2), or a Si—C composite. For example, the Si—C composite may include metallurgical grade silicon.

According to some embodiments, the plurality of silicon-based active material particles may be SiOx (0<x≤2), for example, SiOx (0<x<2). In this case, since the volume expansion rate compared to Si is reduced, life-span properties may be improved.

According to some embodiments, the plurality of silicon-based active material particles may be doped with an auxiliary element, such that resistance may be decreased and output properties may be improved.

For example, the auxiliary element doped to the plurality of silicon-based active material particles may include at least one metal selected from the group consisting of Li, Mg, Al, Ca, Fe, Ti and V.

In an embodiment of the present disclosures, the auxiliary element may include Li or Mg.

For example, the carbon coating layer may include carbon or a conductive polymer. For example, the conductive polymer may include polyacetylene, polyaniline, polypyrrole, and/or polythiophene, etc.

In some embodiments, a content of the carbon coating layer based on a total weight of the composite particles may be from 1 percent by weight (wt %) to 8 wt %. Within the above range, life-span properties may be improved by sufficiently suppressing a side reaction with an electrolyte while inhibiting a decrease in the capacity of the anode active material.

One way to characterize the material composition properties of the anode active material is the well-known Raman spectroscopy by illuminating the anode active material with light and measuring the Raman spectra of the scattered light from the anode active material where the Raman spectra may be processed to extract the information on the material composition properties. In some example embodiments, a relative standard deviation of G/Si peak intensity ratios of a Raman spectrum of an anode active material sample illuminated by probe light as defined in Equation 1 below measured for each of 50 different composite particles among the plurality of composite particles is 50% or less. In some embodiments, the relative standard deviation may be 40% or less.

$$G/Si \text{ peak intensity ratio of Raman spectrum} = I_G/I_{Si} \quad \text{[Equation 1]}$$

In Equation 1, $I_G$ is a maximum peak intensity of each composite particle in a wavenumber range from 1565 cm$^{-1}$ to 1620 cm$^{-1}$ of the Raman spectrum, and $I_{Si}$ is a maximum peak intensity of each composite particle in a wavenumber range from 450 cm$^{-1}$ to 550 cm$^{-1}$ of the Raman spectrum.

For example, in Equation 1, $I_G$ may be a maximum peak intensity value in a G band of carbon included in the carbon coating layer, and $I_{Si}$ may be a maximum peak intensity value of silicon included in the silicon-based active material particle.

For example, the G/Si peak intensity ratio may represent a degree to which the silicon-based active material particles are coated with carbon. For example, in the composite particles, as the G/Si peak intensity ratio is increased, the content of the carbon coating layer based on the weight of the silicon-based active material particle may be increased.

According to some embodiments, the relative standard deviation is defined as a value obtained by dividing a standard deviation of the G/Si peak intensity ratios measured for each of 50 different composite particles by an average of the corresponding ratios and then multiplying by 100.

For example, the relative standard deviation may represent a degree of uniformity of the carbon coating amount of the plurality of composite particles. For example, as the relative standard deviation is decreased, the carbon coating amount of each of the plurality of composite particles may be uniform as a whole.

Within the above relative standard deviation range, an amount of the carbon coating formed on the surface of each of the silicon-based active material particles of the plurality of composite particles may be uniform as a whole. Accordingly, the amount of silicon-based active material particles exposed to the electrolyte among the silicon-based active material particles is decreased, such that a side reaction with the electrolyte is suppressed, and life-span properties of the anode active material may be improved.

According to some embodiments, the G/Si peak intensity ratio of the Raman spectrum may be 1 to 9, and 5 to 9 in some embodiments. Within the above range, life-span properties may be improved by sufficiently suppressing a side reaction with an electrolyte while inhibiting a decrease in the capacity of the anode active material. The G/Si peak intensity ratio (1 to 9 or 5 to 9) of the Raman spectrum may be an average of G/Si peak intensity ratios of the Raman spectrum measured for each of 50 different composite particles among the plurality of composite particles.

For example, the G/Si peak intensity ratios of the Raman spectrum may be values measured for each of 50 different composite particles among the plurality of composite particles.

For example, after forming a sample by uniformly applying the anode active material particles according to the embodiments to a substrate, the G/Si peak intensity ratio of the Raman spectrum may be measured for 50 points different from each other on the sample. The relative standard deviation may be determined by dividing the standard deviation of the 50 measured G/Si peak intensity ratios by an average of the values, and then multiplying by 100.

According to some embodiments, the anode active material may further include graphite-based active material particles. For example, the graphite-based active material particles may include at least one selected from the group consisting of artificial graphite and natural graphite.

An amount of the composite particles in a total weight of the anode active material (e.g., a total weight of the plurality of composite particles and graphite-based active material particles) may be 3 wt % or more, 5 wt % or more, 10 wt % or more, 15 wt % or more, 20 wt % or more, 25 wt % or more, 30 wt % or more, 35 wt % or more, 40 wt % or more, or 45 wt % or more.

The amount of the composite particles in the total weight of the anode active material may be 95 wt % or less, 90 wt % or less, 85 wt % or less, 80 wt % or less, 75 wt % or less, 70 wt % or less, 65 wt % or less, 60 wt % or less, 55 wt % or less, or 50 wt % or less.

In one embodiment, the anode active material may be substantially composed of the composite particles and the graphite-based active material particles.

For example, the content of graphite-based active material particles based on the total weight of the anode active material may be 30 wt % to 80 wt %. Within the above range, life-span properties may be improved while inhibiting a decrease in the capacity of the anode active material.

In some embodiments of the present disclosures, a method of preparing the above-described anode active material for a lithium secondary battery may include the following steps or operations.

A plurality of silicon-based active material particles including a silicon-based active material particle is prepared.

In some example embodiments, the plurality of silicon-based active material particles may be prepared by mixing and calcining a silicon source.

For example, the silicon source may include at least one selected from the group consisting of silicon and silicon dioxide (SiO$_2$). In an embodiment of the present disclosures, the silicon source may be used by mixing silicon and silicon dioxide.

For example, the silicon source may be mixed, input into a reactor, and calcined at a temperature of 400° C. to 800° C. under a vacuum atmosphere. The calcined mixture of silicon source was cooled, pulverized, and classified to prepare a plurality of silicon-based active material particles.

In an embodiment of the present disclosures, the plurality of silicon-based active material particles may include silicon monoxide (SiO).

In example embodiments, the plurality of composite particles each including the carbon coating layer formed on at least a portion of the surface of the silicon-based active material particle is prepared by mixing the prepared plurality of silicon-based active material particles with a carbon source gas and calcining the mixture.

For example, the prepared composite particles may satisfy a relative standard deviation range of G/Si peak intensity ratio values in Raman spectrum according to Equation 1.

For example, the carbon source gas may be a mixed gas of methane gas and argon gas. In some implementations, the mixed gas may further include another gas in addition to the methane gas and argon gas.

For example, as a volume ratio of methane gas in the carbon source gas is decreased, carbon coating may be uniformly performed on the plurality of silicon-based active material particles. In an embodiment of the present disclosures, the lower the volume ratio of methane gas in the carbon source gas, the smaller the above-described relative standard deviation of the G/Si peak intensity ratio in Raman spectrum.

In some embodiments, the content of methane gas based on a total volume of the carbon source gas may be 10 percent by volume (vol %) to 80 vol %, and 20 vol % to 60 vol % in some embodiments. Within the above range, the carbon coating may be sufficiently performed on each of the silicon-based active material particles to improve life-span properties and prevent a decrease in the capacity. In addition, within the above range, the carbon coating may be uniformly performed on the plurality of composite particles.

In some embodiments, the methane gas may be replaced with ethylene gas, propylene gas, or acetylene gas, or may be used together with ethylene gas, propylene gas, or acetylene gas.

In some embodiments, the carbon coating layer may be formed by chemical vapor deposition (CVD). For example, the carbon coating layer may be formed by injecting the carbon source gas into the plurality of silicon-based active material particles and calcining the same at a temperature of about 400° C. to 1200° C. For example, a heating rate during the calcining may be 5° C./min to 20° C./min, and a calcining time may be 60 minutes to 360 minutes.

Figure 2:
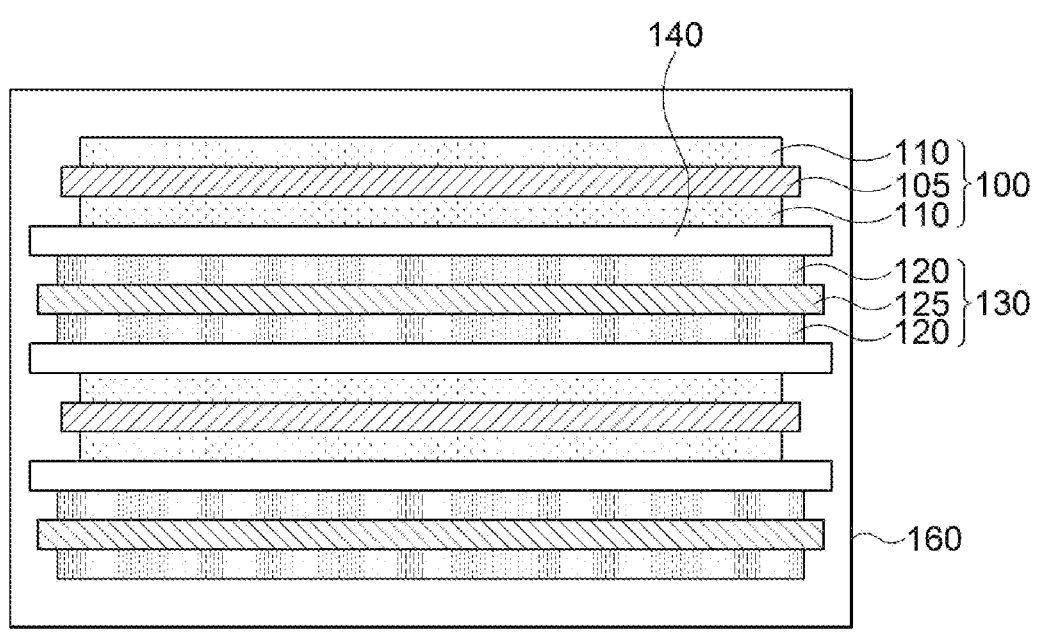
FIG. 2 is a cross-sectional view illustrating an example of a lithium secondary battery based on some embodiments of the present disclosures.

FIGS. 1 and 2 are a schematic plan view and a cross-sectional view illustrating the lithium secondary battery based on some example embodiments, respectively. Specifically, FIG. 2 is a cross-sectional view taken in a thickness direction on line I-I' of FIG. 1, for example.

Referring to FIGS. 1 and 2, the lithium secondary battery may include a cathode 100 and an anode 130 which faces the cathode and includes an anode active material including the above-described composite particles.

The cathode 100 may include a cathode active material layer 110 formed by applying a slurry containing the cathode active material to a cathode current collector 105.

The cathode active material may include a compound capable of reversibly intercalating and deintercalating lithium ions.

The cathode active material for a lithium secondary battery based on some example embodiments may include a lithium-nickel metal oxide.

For example, the lithium-nickel metal composite oxide may further include at least one of cobalt (Co) and manganese (Mn). In some embodiments, the cathode active material includes a Ni—Co—Mn (NCM)-based lithium oxide.

In some embodiments, the cathode active material or the lithium-nickel metal composite oxide may have a layered structure or a crystal structure represented by Formula 1 below.

 [Formula 1]

In Formula 1, x, a, b and z may be in a range of $0.9 \leq x \leq 1.2$, $0.6 \leq a \leq 0.99$, $0.01 \leq b \leq 0.4$, $-0.5 \leq z \leq 0.1$, respectively. As described above, M may include Co and/or Mn.

In some embodiments, a in Formula 1, which is a molar ratio or concentration of Ni, may be 0.8 or more, and may be greater than 0.8 in some embodiments.

The chemical structure represented by Formula 1 indicates a bonding relationship between elements included in the layered structure or crystal structure of the cathode active material, and does not exclude other additional elements. For example, M includes Co and/or Mn, and Co and Mn may be provided as main active elements of the cathode active material together with Ni. Here, it should be understood that Formula 1 is provided to express the bonding relationship between the main active elements, and is a formula encompassing introduction and substitution of the additional elements.

In one embodiment, the inventive material may further include auxiliary elements which are added to the main active elements, thus to enhance chemical stability of the cathode active material or the layered structure/crystal structure. The auxiliary element may be incorporated into the layered structure/crystal structure together to form a bond, and it should be understood that this case is also included within the chemical structure represented by Formula 1.

The auxiliary element may include at least one of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P or Zr, for example. The auxiliary element may act as an auxiliary active element which contributes to the capacity/output activity of the cathode active material together with Co or Mn, such as Al.

For example, a cathode slurry may be prepared by mixing the cathode active material with a binder, a conductive material, and/or a dispersant in a solvent, followed by stirring the same. The prepared cathode slurry may be applied to the cathode current collector 105, followed by drying and pressing the same to prepare the cathode 100.

The cathode current collector 105 may include stainless steel, nickel, aluminum, titanium, or an alloy thereof. The cathode current collector 105 may also include aluminum or stainless steel subjected to surface treatment with carbon, nickel, titanium, or silver.

A non-aqueous solvent may be used as the solvent. For example, N-methyl-2-pyrrolidone (NMP), dimethylformamide, dimethylacetamide, N,N-dimethylaminopropylamine, ethylene oxide, tetrahydrofuran, and the like may be used as the solvent.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for forming the cathode. In this case, an amount of the binder for forming the cathode active material layer 110 may be reduced and an amount of the cathode active material or lithium metal oxide particles may be relatively increased. Thereby, the output and capacity of the secondary battery may be improved.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$, etc.

In example embodiments, an anode slurry may be prepared from the above-described anode active material. For example, an anode slurry may be prepared by mixing the anode active material with an anode binder, a conductive material, and a thickener in a solvent, followed by stirring the same.

For example, the solvent included in the anode slurry may be an aqueous solvent such as water, an aqueous hydrochloric acid solution, or an aqueous sodium hydroxide solution.

For example, the anode binder may include a polymer material such as styrene-butadiene rubber (SBR). Examples of the thickener may include carboxylmethyl cellulose (CMC).

For example, the conductive material may include the same as or similar material to the above-described conductive material included for forming the cathode active material layer.

In some embodiments, the anode 130 may include an anode active material layer 120 formed by applying (coating) the above-described anode slurry to at least one surface of an anode current collector 125, followed by drying and pressing the same.

For example, the anode current collector 125 may include metals having high conductivity, and improved adhesion to the anode slurry while having no reactivity within a voltage range of the secondary battery. For example, the anode current collector 125 may include copper, stainless steel, nickel, titanium, or an alloy thereof. The anode current collector 125 may include copper or stainless steel subjected to surface treatment with carbon, nickel, titanium, or silver.

In some embodiments, a separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having a high melting point, polyethylene terephthalate fiber or the like.

In some embodiments, the anode 130 may have an area (e.g., a contact area with the separation membrane 140) and/or volume larger than those/that of the cathode 100. Thereby, lithium ions generated from the cathode 100 may be smoothly moved to the anode 130 without being precipitated in the middle, for example. Therefore, effects of improving the capacity and output by using the above-described anode active material may be more easily implemented.

According to some embodiments, an electrode cell is defined by the cathode 100, the anode 130, and the separation membrane 140, and a plurality of electrode cells are stacked to form, for example, a jelly roll type electrode assembly 150. For example, the electrode assembly 150 may be formed by winding, lamination, folding, or the like of the separation membrane 140.

The electrode assembly 150 may be housed in a case 160 together with an electrolyte to define the lithium secondary battery. According to some embodiments, a non-aqueous electrolyte may be used as the electrolyte.

The non-aqueous electrolyte includes a lithium salt of an electrolyte and an organic solvent, the lithium salt is represented by, for example, Li+X−, and as an anion (X−) of the lithium salt, F−, Cl−, Br−, I−, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF$, $(CF_3)_6P^-$, $CF_3SiO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As shown in FIG. 1, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

The lithium secondary battery may be manufactured, for example, in a cylindrical shape using a can, a square shape, a pouch type or a coin shape.

Hereinafter, specific experimental examples will be discussed.

Example 1

Preparation of Silicon-Based Active Material Particles

A raw material obtained by mixing silicon (Si) and silicon dioxide ($SiO_2$) was put into a reaction furnace, followed by performing calcination at a temperature of 600° C. for 5 hours under a vacuum atmosphere of 10 Pa. After cooling the calcined mixture, the precipitate was taken out, then pulverized and classified with a ball mill to obtain a plurality of SiO particles having an average particle diameter (D50) of 6 μm. The particle size distribution parameter D50 represents a particular particle size distribution in which the median diameter of all particle sizes in a sample where 50% of the particles are greater than D50 in diameter and 50% of the particles are smaller than D50 in diameter. The plurality of SiO particles were used as a plurality of silicon-based active material particles.

Preparation of Composite Particles Including Carbon Coating Layer

The prepared plurality of silicon-based active material particles were placed in a CVD coater, and a mixed gas of methane gas and argon gas was injected at a flow rate of 50 to 100 ml/min. At this time, the CVD coater was heated up to 900° C. at a heating rate of 5° C./min to 20° C./min, and then maintained at 900° C. for about 60 minutes to 360 minutes to prepare a plurality of composite particles on which a carbon coating layer is formed.

A content of methane gas in the total volume of the mixed gas was 60 vol %.

The content of the carbon coating layer based on the weight of the composite particles was adjusted to be 5 wt %.

Preparation of Anode

The prepared composite particles were used as an anode active material. The anode active material was left for one day, then 90 wt % of the anode active material, 1 wt % of carbon nanotube (CNT) as a conductive material, 5 wt % of styrene-butadiene rubber (SBR) as a binder, and 4 wt % of carboxymethyl cellulose (CMC) as a thickener were mixed to obtain an anode slurry.

The anode slurry was applied to a copper substrate, followed by drying and pressing the same to prepare an anode.

Manufacture of Lithium (Li) Half-Cell

A lithium half-cell including the anode prepared by the above-described method and using lithium (Li) metal as a counter electrode (cathode) was manufactured.

Specifically, a lithium coin half-cell was constructed by interposing a separation membrane (polyethylene, thickness: 20 μm) between the prepared anode and lithium metal (thickness: 1 mm).

A combination of lithium metal/separation membrane/anode was put in a coin cell plate, an electrolyte was injected, and then a cap was covered and clamped. The electrolyte used herein was prepared by adding 2 vol % of FEC based on the total volume of the electrolyte to a 1 M $LiPF_6$ solution prepared using a mixed solvent of EC/EMC (3:7; volume ratio). The manufactured lithium half-cell was impregnated for 3 to 24 hours after clamping, then 3 cycles of charging and discharging at 0.1 C were performed thereon (charging condition: CC-CV 0.1 C 0.01 V 0.01 C CUT-OFF, discharging condition: CC 0.1 C 1.5 V CUT-OFF).

Examples 2 to 13, and Comparative Examples 1 and 2

Anodes and lithium half-cells were manufactured according to the same procedures as described in Example 1, except that the composition of the mixed gas and the input time of the mixed gas were adjusted so as to have the content of methane gas in the total volume of the mixed gas and the content of the carbon coating layer based on the weight of the composite particles as shown in Table 1 below.

Comparative Example 3

An anode and a lithium half-cell were manufactured according to the same procedures as described in Example 1, except that the carbon coating layer was not formed on the silicon-based active material particles.

TABLE 1

| Item | Methane gas content (vol %) | Carbon coating layer content (wt %) |
|---|---|---|
| Example 1 | 60 | 5 |
| Example 2 | 40 | 5 |
| Example 3 | 20 | 5 |
| Example 4 | 60 | 1 |
| Example 5 | 40 | 1 |
| Example 6 | 20 | 1 |
| Example 7 | 60 | 10 |
| Example 8 | 40 | 10 |
| Example 9 | 100 | 10 |
| Example 10 | 20 | 10 |
| Example 11 | 60 | 0.8 |
| Example 12 | 5 | 0.5 |
| Example 13 | 85 | 5 |
| Comparative Example 1 | 100 | 5 |
| Comparative Example 2 | 100 | 1 |
| Comparative Example 3 | — | — |

Experimental Example (1) Raman Spectrum Analysis

For the anode active materials prepared according to the above-described examples and comparative examples, Raman spectra of 50 different composite particles were measured using a 532 nm laser Raman spectroscopy. Specifically, the anode active material was applied to a substrate, then Raman spectra were measured for 50 points different from each other.

In each of the obtained Raman spectra, maximum values (e.g., $I_G$) of the peak intensity in a region of wavenumber 1565 cm$^{-1}$ to 1620 cm$^{-1}$ and maximum values (e.g., $I_{Si}$) of the peak intensity in a region of wavenumber 450 cm$^{-1}$ to 550 cm$^{-1}$ were measured. The measured peak intensities were applied to Equation 1, thus to obtain G/Si peak intensity ratio values in Raman spectrum for 50 different composite particles.

Specific conditions for measuring the peak intensity in Raman spectrum are as follows.
  i) Equipment: Renishaw inVia Raman spectroscopy
  ii) Wavelength of illumination light used for illuminating the sample: 532 nm
  iii) Grating parameter of the optical grating for diffracting different Raman spectral components: 1800 L mm
  iv) Detector: CCD
  v) Objective lens: ×20

The conditions for processing data measured through the Raman spectrum are as follows.
  i) Data processing software: Resolutions Pro.
  ii) Baseline setting region for measurement of G/Si peak intensity ratio
  Si peak: 200/600 baseline
  G band peak: 1100/1800 baseline At this time, measurement was performed under a condition where a peak area in a wavenumber range of 1565 cm$^{-1}$ to 1620 cm$^{-1}$ is 10000 or more, and a peak area in a wavenumber range of 450 cm$^{-1}$ to 550 cm$^{-1}$ is 1000 or more.

The relative standard deviation was calculated as a value obtained by dividing a standard deviation of the obtained G/Si peak intensity ratio values by an average of the G/Si peak intensity ratio values and then multiplying by 100.

Figure 3:
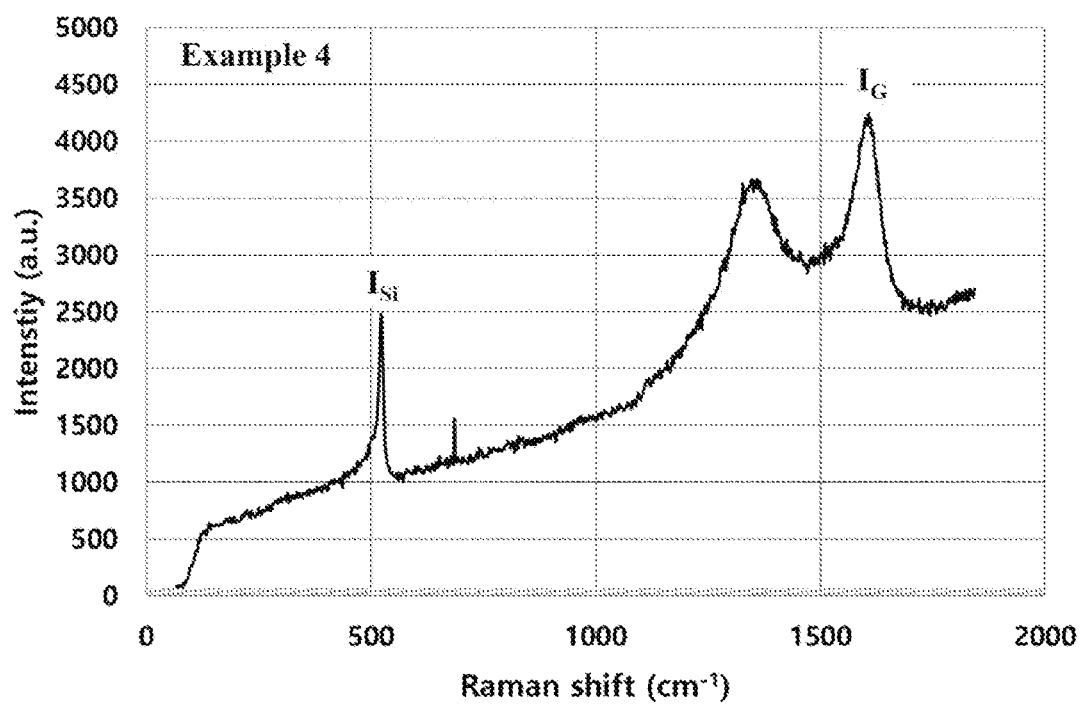
FIG. 3 is a peak intensity graph of a Raman spectrum of Example 4 of the present disclosure.

FIG. 3 is a peak intensity graph of a Raman spectrum of Example 4 of the present disclosure.

Referring to FIG. 3, $I_G$ and $I_{Si}$ were measured by the Raman spectrum analysis.

(2) Evaluation of Initial Discharge Capacity and Capacity Retention Rate

The lithium half-cells manufactured according to the above-described examples and comparative examples were charged with a constant current at room temperature (25° C.) at a current of 0.1 C rate until the voltage reached 0.01 V (vs. Li), and then constant voltage charging was performed by cutting off at a current of 0.01 C while maintaining 0.01 V. Thereafter, the lithium half-cells were discharged with a constant current at a rate of 0.1 C until the voltage reached 1.5 V (vs. Li).

The charging and discharging process was set to be one cycle, and one cycle of charging and discharging was further performed in the same manner. Thereafter, the applied current was changed to 0.5 C, then 50 cycles of charging and discharging were performed, while having a rest time of 10 minutes between the cycles.

The discharge capacity after the first cycle was evaluated as an initial discharge capacity, and the capacity retention rate was evaluated by calculating the discharge capacity after 50 cycles as a percentage compared to the discharge capacity after the first cycle.

Evaluation results are shown in Table 2 below.

TABLE 2

| Item | Average of G/Si peak intensity ratio | Relative standard deviation of G/Si peak intensity ratio (%) | Initial discharge capacity (mAh/g) | Capacity retention rate (%) |
|---|---|---|---|---|
| Example 1 | 5.15 | 35.78 | 1671 | 89.8 |
| Example 2 | 5.14 | 25.56 | 1670 | 90.2 |
| Example 3 | 5.13 | 24.53 | 1670 | 90.1 |
| Example 4 | 1.23 | 44.45 | 1735 | 87.6 |
| Example 5 | 1.10 | 42.81 | 1736 | 88.7 |
| Example 6 | 1.09 | 38.45 | 1736 | 88.4 |
| Example 7 | 8.64 | 24.65 | 1540 | 92.5 |
| Example 8 | 8.49 | 21.36 | 1542 | 93.4 |
| Example 9 | 8.56 | 35.12 | 1538 | 91.1 |
| Example 10 | 8.51 | 18.42 | 1541 | 93.2 |
| Example 11 | 0.93 | 45.20 | 1751 | 85.8 |
| Example 12 | 0.78 | 15.47 | 1770 | 84.3 |
| Example 13 | 6.24 | 48.91 | 1671 | 86.2 |

TABLE 2-continued

| Item | Average of G/Si peak intensity ratio | Relative standard deviation of G/Si peak intensity ratio (%) | Initial discharge capacity (mAh/g) | Capacity retention rate (%) |
|---|---|---|---|---|
| Comparative Example 1 | 5.23 | 51.81 | 1670 | 80.7 |
| Comparative Example 2 | 1.12 | 59.35 | 1732 | 76.5 |
| Comparative Example 3 | — | — | 1825 | 61.2 |

Referring to Table 2, in the examples having a relative standard deviation of the G/Si peak intensity ratio of 50% or less, the initial discharge capacity and capacity retention rate were improved compared to the comparative examples.

In Examples 7 to 10, the content of the carbon coating layer based on the weight of the composite particles was greater than 8 wt %, such that the initial discharge capacity was decreased compared to other examples.

In Example 11, since the content of the carbon coating layer based on the weight of the composite particles was less than 1 wt %, the carbon coating was not sufficiently performed, and thus the capacity retention rate was decreased compared to other examples.

In Example 12, since the content of methane gas in the carbon source gas was less than 10 vol % during the carbon coating, the carbon coating was not sufficiently performed, and thus the capacity retention rate was decreased compared to other examples.

In Example 13, since the content of methane gas in the carbon source gas was greater than 80 vol % during the carbon coating, the carbon coating was non-uniformly formed on the plurality of composite particles, and thus the capacity retention rate was decreased compared to other examples.

In Comparative Example 3, since the carbon coating layer was not formed, a side reaction between the silicon-based active material particles and the electrolyte was increased, and thus the capacity retention rate was remarkably decreased.

The present disclosures can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the present disclosures can be implemented in some embodiments to provide improved electrochemical devices such as a battery used in various power sources and power supplies, thereby mitigating climate changes in connection with uses of power sources and power supplies. Lithium secondary batteries based on the present disclosures can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments of the present disclosures are described in this patent document. Variations, improvements and enhancements of the disclosed embodiments and other embodiments may be made based on the disclosure of this patent document.

What is claimed is:

1. An anode active material for a lithium secondary battery comprising:
   a plurality of composite particles, each composite particle including:
      a silicon-based active material particle including at least one of silicon (Si) or silicon oxide SiOx, wherein x is larger than 0 and smaller than 2; and
      a carbon coating layer formed on at least a portion of a surface of the silicon-based active material particle, the carbon coating layer including conductive carbon,
   wherein a relative standard deviation of G/Si peak intensity ratios of a Raman spectrum as defined in Equation 1 measured for each of 50 different composite particles among the plurality of composite particles is 50% or less,
   wherein the G/Si peak intensity ratios of the Raman spectrum are in a range from 5 to 9:

$$G/Si \text{ peak intensity ratio of Raman spectrum} = I_G/I_{Si}, \quad \text{[Equation 1]}$$

wherein, in Equation 1, $I_G$ is a maximum peak intensity of each composite particle in a wavenumber range from 1565 cm−1 to 1620 cm−1 of the Raman spectrum, and $I_{Si}$ is a maximum peak intensity of each composite particle in a wavenumber range from 450 cm−1 to 550 cm−1 of the Raman spectrum.

2. The anode active material according to claim 1, wherein a content of the carbon coating layer based on a total weight of the composite particles is in a range from 1 percent by weight (wt %) to 8 wt %.

3. The anode active material according to claim 1, wherein the silicon-based active material particle is doped with at least one of Li, Mg, Al, Ca, Fe, Ti, or V.

4. A lithium secondary battery comprising:
   an anode comprising the anode active material for a lithium secondary battery according to claim 1; and
   a cathode disposed to face the anode.

5. A method of preparing an anode active material for a lithium secondary battery, comprising:
   preparing a plurality of silicon-based active material particles including at least one of silicon (Si) or silicon oxide SiOx, wherein x is larger than 0 and smaller than 2,
   wherein the preparing the plurality of silicon-based active material particles comprises mixing and calcining a silicon source, wherein the silicon source includes at least one of silicon or silicon dioxide (SiO2); and
   forming a plurality of composite particles, each composite particle including a carbon coating layer including conductive carbon and formed on at least a portion of a surface of at least one of the plurality of silicon-based active material particles by mixing the plurality of silicon-based active material particles with a carbon source gas to generate a mixture and calcining the mixture at a temperature of 400° C. to 1200° C.,
   wherein a relative standard deviation of G/Si peak intensity ratios of a Raman spectrum as defined in Equation 1 measured for each of 50 different composite particles among the plurality of composite particles is 50% or less, wherein the G/Si peak intensity ratios of the Raman spectrum are in a range from 5 to 9:

$$G/Si \text{ peak intensity ratio of Raman spectrum} = I_G/I_{Si}, \quad \text{[Equation 1]}$$

wherein, in Equation 1, $I_G$ is a maximum peak intensity of each composite particle in a wavenumber range from 1565 cm−1 to 1620 cm−1 of the Raman spectrum, and $I_{Si}$ is a maximum peak intensity of each composite particle of a wavenumber range from 450 cm−1 to 550 cm−1 of the Raman spectrum.

* * * * *